United States Patent [19]

Sisson et al.

[11] 3,990,549

[45] Nov. 9, 1976

[54] BRAKE CONTROLLED MODULATING CLUTCH VALVES

[75] Inventors: Ronald L. Sisson; Philip J. Dreves, both of Jackson, Mich.

[73] Assignee: Clark Equipment Company, Buchanan, Mich.

[22] Filed: June 30, 1975

[21] Appl. No.: 591,547

[52] U.S. Cl............................. 192/4 A; 192/109 F; 192/87.19; 137/625.69
[51] Int. Cl.².................... F16D 67/04; B60K 41/26
[58] Field of Search................. 192/4 A, 4 C, 13 R, 192/87.18, 87.19, 109 F, 103 F

[56] References Cited
UNITED STATES PATENTS

| | | | |
|---|---|---|---|
| 2,814,371 | 11/1957 | Bolster et al. | 192/13 R |
| 2,861,480 | 11/1958 | Curtis | 74/732 |
| 2,972,906 | 2/1961 | Schroeder | 74/732 |
| 3,155,208 | 11/1964 | Biabaud | 192/13 R |
| 3,243,025 | 3/1966 | Staab et al. | 192/87.19 |
| 3,339,672 | 9/1967 | Crandall | 192/13 R |
| 3,850,273 | 11/1974 | Murakami | 192/4 A |

*Primary Examiner*—Benjamin W. Wyche
*Attorney, Agent, or Firm*—Ernst H. Ruf

[57] ABSTRACT

In a control system for a vehicle having a transmission with fluid actuated frictional engaging means and brake means wherein a first hydraulic passage means interconnects a fluid pressure source with the frictional engaging means, a regulating valve is disposed in the first hydraulic passage means, for regulating the pressure of the pressure fluid supplied to the frictional engaging means, with the regulating valve means also being operatively connected with the brake means and responsive to the degree of actuation of the brake means and actuatable between a first and a second position, whereby in the first position the pressure fluid can freely flow into, through and out of the inching valve toward the frictional engaging means, however in the second position, the fluid flow through a first set of radial apertures is blocked by a regulating spool and thereafter further radial apertures are progressively opened by the regulating spool means so as to regulate the force of the pressure fluid acting on the frictional engaging means. One embodiment of this invention is a downstream regulator that regulates the flow of pressure fluid into the regulator valve whereas another embodiment of this invention is a bypass type downstream regulator valve that regulates the flow of pressure fluid out of the regulator valve. Both of these embodiments feature a quick initial pressure drop over a short distance of valve travel, followed by a low further pressure drop over a long distance of valve travel, thus permitting insensitive control by the vehicle operator and thereby permitting smooth vehicle performance.

12 Claims, 4 Drawing Figures

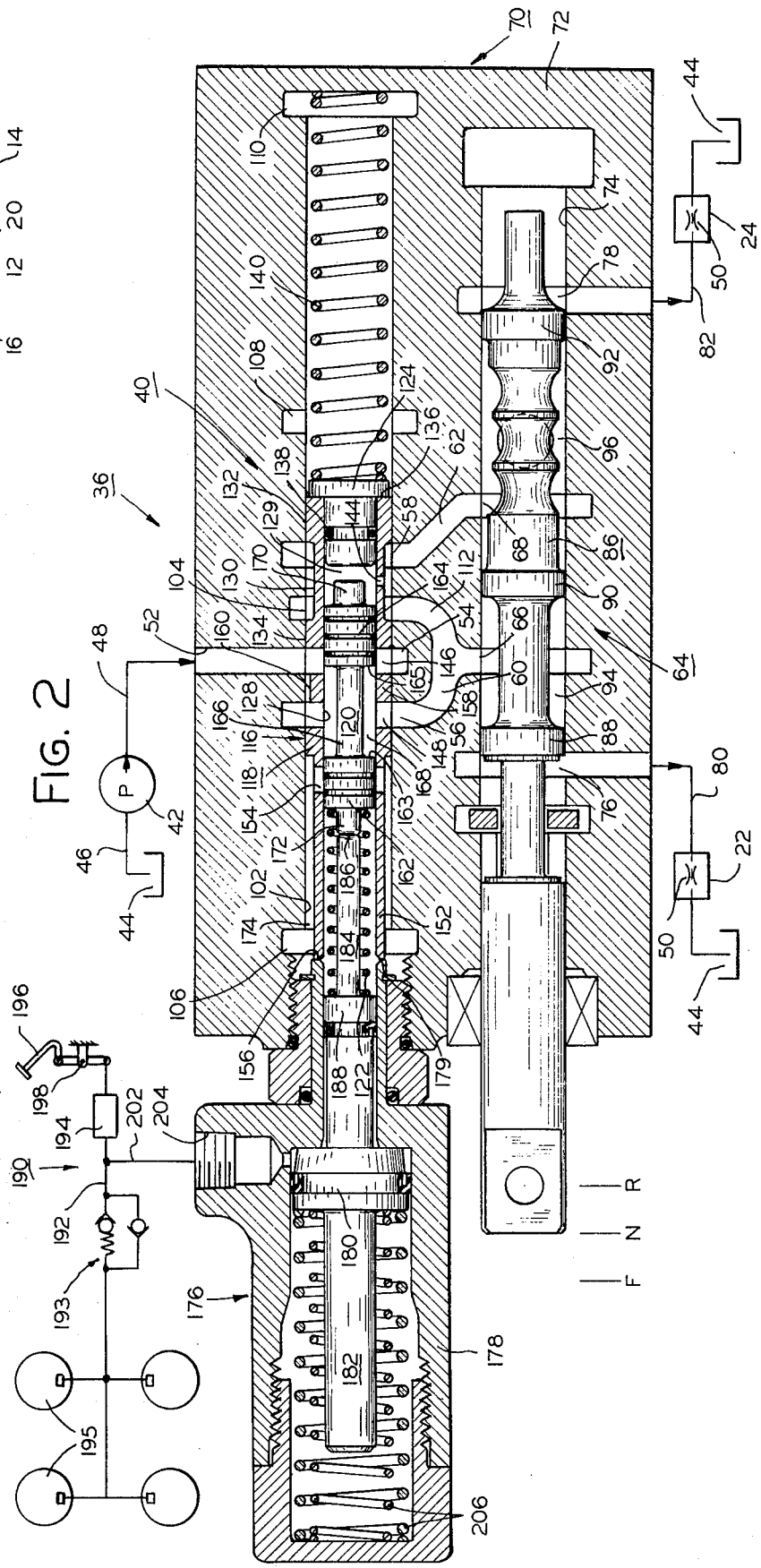

BRAKE CONTROLLED MODULATING CLUTCH VALVES

BACKGROUND OF THE INVENTION

1. Field of the Invention

The field of art to which this invention pertains includes pressure regulating valve means for use in fluid operated control systems. More particularly, the regulating valves of this invention are constructed to control and regulate fluid pressure, and they may be disposed, for example, between a source of pressurized fluid and a device operated thereby, such as a transmission clutch.

2. Description of the Prior Art

Briefly, this invention constitutes an improvement in pressure regulating valves, with such valves often being used in the prior art for regulating pressure to a fluid operated clutch of the type often found in the constant-mesh power-shift transmissions of industrial vehicles, such as lift trucks, and other machines. Specifically, such prior art control valves are frequently constructed to permit an immediate relief of a portion of the clutch application pressure followed by a regulated decrease or increase in the fluid pressure applied to the fluid clutch whereby the latter may be gradually disengaged or engaged by the operator. One particular use of this type of regulating valve, contemplates the control of a fluid-pressure actuated clutch for the transmission of an industrial vehicle, such as a lift truck, where it is often necessary to hold a truck stationary while the lift fork is operated at a speed corresponding to full engine speed without shifting the transmission to the neutral position. It is desirable, in such circumstances, to be able to precisely move or "inch" the vehicle in either the forward or reverse direction in order to achieved accurate positioning in the handling of materials.

Various controls and regulating valves for performing the abovestated function in conjunction with power-shift transmissions employing fluid pressure actuated transmission clutches have been disclosed previously as exemplified by U.S. Pat. No. 3,143,127, to Frost, issued Aug. 4, 1964. In order to carry out its regulating valve function, the valve means, such as described in said patent, have been provided to effect improved gradual engagement and disengagement of the vehicle clutch and the relief of excess pressure in the system by operating such valve means in conjunction with the application and release of the vehicle brakes. In such structures, wherein the operation of the valve means may be either hydraulic or mechanical, when the brakes are actuated the valve means shifts to a position partially interrupting fluid flow from a clutch control valve and affects controlled partial deactuation of the clutch means by maintaining a relatively low fluid pressure, thus providing control of the torque to the wheels of the vehicle.

Prior art patents dealing with inching valves wherein the flow of pressurized fluid to the clutch undergoing inching is completely cut off during at least a portion of the inching cycle include U.S. Pat. Nos. 2,861,480 to Curtis and 3,339,672 to Crandall.

The presence of a bypass arrangement, which keeps at least some fluid flowing to the clutch undergoing inching, insures a continuous supply of fluid to the clutch so that, at the termination of the inching function, there is no delay occasioned by the refilling of the clutch. Prior art U.S. Pat. Nos. 2,814,371 to Bolster et al. and 2,972,906 to Schroeder, disclose inching valves that incorporate internal bypass arrangements.

SUMMARY OF THE INVENTION

The regulating valve means of this invention are utilized in a hydraulic control system for a vehicle that also includes a brake means and wherein a hydraulic passage connects a source of fluid pressure with the clutch means. Basically, the regulating valve means are fluidically interconnected or interposed in the hydraulic passage means, for regulating the fluid pressure applied to the clutch means. The regulating valves are operatively connected with the brake system and responsive to the degree of actuation of the brake pedal and actuatable between first and second positions whereby in the first position, the pressure fluid can freely flow into, through and out of the regulating valve. However, in the second position, the fluid flow through the normal radial apertures is blocked by a regulating spool and thereafter other radial apertures are progressively opened by the regulating spool so as to regulate the force of the pressure fluid acting on the clutch means.

One of the regulating valves of this invention is a downstream regulator that regulates the flow of fluid into the valve.

In another embodiment of this invention, the inlet and first outlet apertures are also connected by a longitudinal aperture in an annular valve spool means, whereby when the regulating spool means is in the noted first position, the pressure fluid can flow freely into, through and out of the regulating valve so as to effectively bypass the longitudinal aperture. However, when the pressure fluid flow through the first radial apertures is blocked off, the pressure fluid can still flow through this longitudinal aperture thereby keeping the clutch filled with fluid at all times. The regulating valve having this longitudinal aperture may be characterized as a bypass type regulator valve of the downstream type that regulates the flow of pressure fluid out of the regulating valve.

In both embodiments of this invention, the initial pressure drop within the regulating valve occurs during a very short travel distance of the valve actuation means, with the additional travel distance, which in effect represents inching, being quite long, thus permitting insensitive control by the vehicle operator and thereby allowing smooth inching performance.

In regard to the bypass type regulator valve, keeping the clutch filled with fluid not only permits quicker clutch response but also minimizes the effect of possible fluid leakage from the clutch.

Other features and advantages of these improved regulating valves will be more readily understood by persons skilled in the art when following the detailed description in conjunction with the drawings.

BRIEF DESCRIPTION OF THE DRAWINGS

FIG. 1 shows an industrial vehicle, such as a lift truck, embodying the present invention.

FIG. 2 is a schematic diagram of a typical fluid system in which the preferred embodiment of the regulating valves of this invention finds utility.

FIG. 3 is a fragmentary structural view of another embodiment of the regulating valves of this invention.

FIG. 4 shows a typical pressure vs. distance relationship for the regulating valves of this invention.

Referring now to the drawings in detail; in FIG. 1, the reference numeral 10 generally denotes an industrial vehicle, such as a lift truck, having a body 12 supported by a pair of drive wheels 14 and a pair of dirigible wheels 16. An engine 18 is disposed in body 12 and is connected to drive wheels 14 through a power shift transmission 20 which includes a fluid pressure actuated forward clutch 22 (FIG. 2) and a fluid pressure actuated reverse clutch 24 (FIG. 2). Located on body 12 is an operator's station 26 which includes a seat 28, a steering wheel 30 and various hand as well as foot controls. Mounted on the front of lift truck 10 is a telescopic upright 32 which carries a pair of forwardly extending load engaging fork arms 34 adapted to be inserted into a pallet on which a load is placed.

Referring now to FIG. 2, one embodiment of the regulator valves of this invention will now be described. Numeral 36 generally denotes a typical fluid system or circuit in which the regulator or inching valve, generally denoted by numeral 40, is utilized. Fluid circuit 36 includes a pump 42, driven proportional to engine speed, which draws fluid from a reservoir 44 via a fluid conduit 46 and supplies fluid at a constant pressure to inlet port 52 and groove 54 of regulator valve 40, via conduit 48. As will be explained in detail later, pressurized fluid emerges from regulator valve 40 at outlet ports 56 and 58 and flows, via conduits 60 and 62 respectively, to inlet ports 66 and 68 of a directional control valve generally denominated by numeral 64.

As shown in FIG. 2, directional control valve 64 and regulator valve 40 are preferably located in a control cover 70 that includes a valve block or housing 72. Directional control valve 64 includes a longitudinally extending bore 74, with a closed end, that intersects with inlet ports 66 and 68 as well as spaced outlet ports 76 and 78, which in turn are connected to forward and reverse clutches 22 and 24 via conduits 80 and 82 respectively. Each one of clutches 22 and 24 includes internal orifice means 50 and is also connected to reservoir 44, with each orifice means 50 permitting controlled flow of pressurized fluid from its associated clutch back to the reservoir.

Slidably disposed in bore 74 of valve 64 is a spool 86 which controls the fluid flow between inlet ports 66 and 68, and outlet ports 76 and 78. Spool 86 has three spaced land portions 88, 90 and 92, with lands 88 and 90 cooperating in the neutral position shown in FIG. 2 to contain the pressurized fluid entering through inlet port 66 within annular spool area 94. At the same time, spool lands 90 and 92 also cooperate in the neutral position to contain the pressurized fluid entering through inlet port 68 in generally annular valve area 96. Thus, in the neutral position, the pressurized fluid entering directional control valve 64 is kept from entering either of outlet ports 76 and 78. Basically, valve spool 86 is of the double acting type and the positioning thereof is in response to the actuation of a selector lever (not shown) available to the operator of the vehicle. The positioning of selector spool 86 serves to control the passage of pressurized fluid to conduits 80 or 82 and thus to control the operation of forward and reverse transmission direction clutches 22 and 24. In this regard, it should be noted that spool 86 has three positions of operation, neutral as shown in FIG. 2 or to either side of the neutral position to selectively admit pressurized fluid to either of the two direction clutches 22 and 24 in a manner well known in the art.

Reference is now made to FIG. 2 which shows that regulator valve 40 is also contained within valve body 72. Regulator valve 40 includes a longitudinally extending bore 102 and communicating therewith, in addition to inlet port 52 as well as outlet ports 56 and 58, are port 104 and drain grooves or ports 106, 108 and 110. Grooves 106, 108 and 110 are all connected via conduits (not shown) back to reservoir 44 while port 104 is connected with port 56 via a portion of conduit 60 and conduit 112.

Slidably disposed in bore 102 of regulator valve 40 is a spool assembly, generally denominated by numeral 116, which controls the fluid flow between inlet port 52, outlet ports 56 and 58 and drain groove 106. Spool assembly 116 includes a fixed outer spool member 118, a movable inner spool member 120, a regulating spring 122 and combined stop and seal member 124.

Outer or annular spool member 118, which is slidably disposed in bore 102 and has a longitudinally extending bore 128, also includes an annular groove 130 in the outer periphery thereof, with annular groove 130 defining annular land 132 on one end thereof and annular land 134 at the other end thereof. The open annular end face 136 of land portion 132 is closed off by combined stop and seal member 124 which is provided with O-ring seal 138. A biasing spring 140 is disposed in bore 102 between combined seal and stop member 124 and the adjacent end of the bore.

Annular groove 130 is connected to chamber 129 in bore 128 by means of a connecting passage 144 which preferably takes the form of a small diameter orifice. Outer spool member 118 is further provided with one or more radial apertures 146 that are always axially aligned with inlet port 52 and groove 54. In addition, outer spool member 118 is provided with one or more radial apertures 148 that are always axially aligned with outlet port 56. Outer spool member 118 is further provided with an integral tubular portion 152 of reduced diameter having one or more radial apertures 154 near the inner end thereof and an annular end surface 156 on the outer end thereof. FIG. 2 also shows that at least one of each of radial apertures 146 and 148 are connected via a longitudinal internal aperture or passageway 160 which preferably takes the form of a 0.050 to 0.070 inch diameter orifice, with orifice 160 extending through portion 158 of outer spool member 118.

Contained within outer spool member bore 128 is inner spool or regulating member 120 which includes spaced land portions 162 and 164 that are connected by a central portion 166 and together with bore 128 define therewith annular cavity 168. The outer ends of land portions 162 and 164 are provided with locating or abutting portions 170, 172 respectively, with portion 170 being capable of abutting stop and seal member 124 in the absence of fluid pressure within fluid circuit 36. Portion 172 serves to locate and retain one end of regulating spring 122.

Threadably connected to valve body 72 is body portion 178 of a piston and cylinder actuator means 176 which is disposed coaxially with regulator valve bore 102 and a portion of which extends a short distance thereinto and abuts outer end surface 156 of outer spool member 118. It is the function of biasing spring 140 to permanently bias outer spool member 118 against the inner annular end surface 179 of body portion 178. Slidably disposed in cylinder body 178 is a piston 180 having an outer rod portion 182 and an inner rod portion 184 whose end surface 186 is capable of abutting inner spool member locating portion 172 as will be described in more detail hereinafter. Inner rod portion 184 also includes an intermediate flange portion 188 that serves to confine the outer end of regulating spring 122.

As shown in FIG. 2, fluid system 36 is also connected to the vehicle hydraulic brake system 190. Conduit 192, containing brake control valve 193, is connected to the vehicle brakes 195 and to a master cylinder 194 which in turn is connected to a brake pedal 196 pivotable on vehicle body 12 at 198. A branch conduit 202 also connects conduit 192 with inlet port 204 of actuating means 176.

It should be understood at this time that the actuation of master cylinder 194 generates pressurized fluid which is directed into an actuator means 176 for axially displacing piston 180 (and thus spool member 120) which is normally biased to rest position by one or more return springs 206. Although not desribed herein, actuator means 176 is provided with suitable sealing means for preventing fluid leakage therefrom or fluid seepage thereinto.

While actuation of inching valve 40 is described with reference to hydraulic acutator means 176, it should be understood that valve 40 could also be actuated via a mechanical linkage (not shown) that interconnects valve 40 and brake system 90. It should be clear that while hydraulic or fluidic actuation of valve 40 is shown, the invention is not limited thereto.

In operation, when vehicle 10 is standing with its engine idling, regulator valve 40 is in its inactive or rest position whereby pressurized fluid is delivered by pump 42, via conduit 48, into regulator valve 40. Upon entering inlet port 52, the fluid flows through outer spool member apertures 146 into cavity 168. After flowing through cavity 168, the pressurized fluid exits through apertures 148 and enters conduit 60 via outlet port 56. Conduit 60 extends to inlet port 66 of directional control valve 64 and also merges with one end of conduit 112 whose other end is connected, via port 104, to annular groove 130 in regulator valve 40. Annular groove 130 is thus in continuous communication with chamber 129 of bore 128 via connecting passage 144. In addition, pressurized fluid also exits from annular groove 130 via outlet port 58 and is directed, via conduit 62, to inlet port 68 of directional control valve 64. As previously noted, if directional control valve 64 is in a position other than neutral (as shown in FIG. 2), it selectively admits the pressurized fluid to either of the two directional control clutches 22 or 24.

Now, assuming that lift truck 10 is traveling forwardly in a normal manner, pressurized fluid continues to pass through regulating valve 40 in the previously-described manner. Further assuming that the operator desires to inch vehicle 10, he depresses brake pedal 196 with his foot thereby causing it to pivot at 198, thus exerting fluid pressure on piston 180 of actuating means 176 and causing the former to be axially displaced. Brake control valve 193 delays the application of brakes 195 until a predetermined pressure input by the operator is attained. The axial outward displacement of piston 180, which is opposed by the bias of return springs 206, also allows axial sliding leftward movement of inner or regulating spool 120 due to the pressure of fluid within chamber 129. As shown in FIG. 2, since inner edge 165 of land 164 already partially closes apertures 146 at the rest or neutral position, only a small axial leftward movement, e.g., only a fraction of an inch, will cut off the fluid flow path through apertures 146 into cavity 168 and will progressively open apertures 154. The opening of apertures 154, via the leftward movement of land 162, will cause a substantial pressure drop within cavity 168 and consequently in forward clutch 22. This initial pressure drop vs. piston travel is graphically shown by lines 210, 212 respectively, in FIG. 4.

Once the flow of fluid through apertures 146 is blocked, then the pressurized fluid is forced to flow solely through longitudinal aperture or orifice 160 in outer spool member portion 158 thus permitting fluid to continue to enter cavity 168 via one of apertures 148. As previously noted, movement of spool member 120 to the left also causes inner edge 163 of land 162 to open apertures 154. The opening of apertures 154 of course permits not only some of the fluid entering in through aperture 160, but also some of the fluid downstream from aperture 160, to flow out of cavity 168 via annular cavity 174 (between bore 102 and spool portion 152) and drain groove 106 back to the reservoir. During the inching operation, the forward or reverse clutch (depending on the position of directional control valve 64), of course, slips and the fluid pressure is decreased, in the manner previously described, in order to permit the slippage.

In the inching mode, the leftward movement of inner spool member 120 continues until radial apertures 146 are covered and thereupon apertures 154 are progressively uncovered, with the result that the fluid pressre in regulator valve 40 drops from the full clutch engaging pressure of about 185 PSI to a regulating pressure which, for example, may range from a maximum of 30 PSI down to substantially 0 PSI. Regulating spool 120 continues to uncover apertures 154 until the pressure in valve 40 drops to the point where the force exerted on the outer end of land 164 by the pressure fluid in chamber 129 is in balance with the opposing force exerted by regulating spring 122. Thus, regulating spool control edge 163 and the edges of apertures 154 serve to regulate the fluid pressure being delivered to forward clutch 22. Regulating spool member 120 will move slightly to the right to close off apertures 154 to compensate for a pressure drop caused by fluid leaking from the clutch, for example, and move slightly to the left to open communication with apertures 154 to compensate for a pressure rise. As best seen in FIG. 4, while the initial pressure drop, as indicated by line 210, occurs during a very short travel distance 212 of piston 180, the additional travel distance of piston 180, as indicated by line 214, is quite long, thus permitting insensitive control by the vehicle operator and thereby permitting smooth inching performance.

It should be understood that axial position of piston 180 (and thus flange portion 188) determines the force exerted by regulating spring 122 on inner spool member 120 which in turn determines the pressure maintained in the engaged clutch by the regulating valve. Continued leftward movement of piston 180, caused by increased pressure on the brake pedal, causes a continued decrease in the pressure maintained in the clutch. It should also be understood that in order for the regulating spring 122 to perform its function, end surface 186 of inner rod portion 184 must be free from engagement with inner spool member locating portion 172.

It should also be understood that the travel of piston 180 is of course controlled by the length of outer rod portion 182 which, upon the maximum displacement of piston 180, will abut the outer end wall of cylinder body 178.

Assuming now that the operator has depressed the brake pedal (so that inner or regulating spool member 120 is maintaining a regulated pressure to clutch 22 intermediate the minimum and maximum regulated pressures), by allowing the brake pedal to return to its normal position, via the bias of return springs 206, the result is that the compression of regulating spring 122 progressively increases, and thus the regulated pressure being maintained by spool member 120 also increases. Just before piston rod end surface 186 comes into abutment with locating portion 172 of spool member 120, spool member 120 will be maintaining the maximum regulated pressure for inching operation, which pressure may, for example, be approximately 30 PSI. Further rightward movement of piston 180 carries spool member 120 along with it. Since only a fraction of an inch of travel of spool member 120 to the right, from its regulating position, results in full pressure being delivered to the clutch, it is virtually impossible for the operator to position spool member 120 over this distance of travel to further regulate the fluid pressure being communicated to clutch 22, and so for all practical purposes the fluid pressure to the clutch increases rapidly from the maximum regulated inching pressure of about 30 PSI to the full system pressure which may be on the order of about 185 PSI.

From the preceding description it should be clear that, in the normal or non-inching mode of operation, the pressurized fluid required for clutch operation flows freely through apertures 146 and effectively by-passes aperture 160. However, once the flow through apertures 146 is blocked, then the pressurized fluid is forced to flow through aperture or orifice 160. Aperture 160 which may, for example, to the form of a 0.070 inch orifice, acts as a bypass when apertures 146 are closed off and keeps one or the other of clutches 22 and 24 filled with pressurized fluid at all times, with fluid from the clutch undergoing inching flowing back to reservoir 44 via apertures 154, cavity 174 and drain groove 106. Valve 40 may be described as a downstream regulator whose regulating member control edge 163 cooperates with apertures 154 to meter or regulate fluid out of cavity 168. Orifice 160 acts as a bypass and keeps the clutch filled at all times, even after the normal inlet has been completely closed off. Keeping the clutch filled with fluid permits quicker clutch response and minimizes the effect of possible fluid leakage from the clutch.

Reference is now made to FIG. 3 which if a fragmentary structural view of a portion of another embodiment of the regulator valves of this invention. This regulator or inching valve, generally denominated by numeral 240, is utilized in typical fluid system or circuit 36 previously discussed with reference to regulator or inching valve 40. Only a fragmentary structural view of regulator valve 240 is shown in FIG. 3 since it is identical with the structure of regulator valve 40 with the exception that it does not have orifice or aperture 160 in portion 158 of its outer spool member. Therefore, the outer spool member in regulator valve 240 is denominated by numeral 218 and, with the exception of the absence of orifice for aperture 160, it is identical with the previously-described outer spool member 118 that is utilized in regulator valve 40 and the previous structural description and numerals utilized in conjunction with regulator valve 40 are thus also applicable to outer spool member 218 and regulator valve 240.

Referring again to FIG. 3 and regulator valve 240, it should be noted that the operation of this valve, which is used in fluid circuit 36 in the same manner as previously-discussed regulator valve 40, is dissimilar to that of valve 40. Due to the absence of orifice 160, no additional fluid will be supplied to cavity 168 after control land edge 165 completely closes off apertures 146. In valve 240, similar to valve 40, fluid under pressure enters inlet port 52 and flows through apertures 146 and annular cavity 168 as well as outlet ports 56 and 58 to inlet ports 66 and 68 of directional control valve 64. Fluid under pressure is also supplied to chamber 129 (by flowing through passage or orifice 144) thus permitting, after brake pedal 196 has been at least partially depressed by the operator, movement of inner spool member 120 in one direction, with spool land edge 165 cooperating with apertures 146 to act as a regulator but maintaining an about 175–200 PSI clutch pressure. When the vehicle brakes are applied, brake fluid enters actuating means 176 and starts to move piston 180 against biasing springs 206, thus starting the inching mode. Interposed between flange portion 188 of piston rod 184 and land area 162 of inner spool member 120 is regulating spring 122 which opposes the hydraulically actuated movement of spool member 120.

Basically, during inching, inner spool member 120 continues to move to the left until the differential clutch pressure, reacting back from directional control valve 64, balances the effective pressure of regulating spring 122, at which point spool member 120 stops moving. In operation, spool member 120 continues moving progressively to the left until its land control edge 165 completely closes off apertures 146 and thereupon apertures 154 are progressively uncovered by land edge 163. In its inching position, spool member 120 balances itself against regulating spring 122 before land edge 165 completely closes off apertures 146 so that reduced flow and therefore reduced pressure is transmitted to outlet ports 56 and 58 leading to directional control valve 64 and therefore to the selected clutch, resulting in controlled slippage of the selected clutch back to a degree determined by the applied brake pressure.

Depending on the brake line pressure, apertures 146 are progressively blocked off and spool edge 163 opens up radial apertures 154, thereby permitting fluid from the selected clutch to drain to reservoir or sump 44 via cavity 174 and drain groove 106. Regulating spool member 120 will move slightly to the right to close off apertures 154 and thereupon to compensate for a pressure drop caused by fluid leaking from the clutch, for example, and move slightly to the left to close off apertures 146 and thereupon progressively open apertures 154 to compensate for a pressure rise. Inching valve 240 may be described as a downstream regulator whose regulating member control edge 165 cooperates with apertures 146 to meter or regulate fluid into cavity 168. Contrary to valve 40 in FIG. 2, valve 240 does not utilized a bypass orifice but rather shuts the clutch pressure supply off completely once apertures 146 are covered.

While the invention has been described in connection with several possible forms or embodiments thereof, it is to be understood that the present disclosure is illustrative rather than restrictive and that further changes or modifications may be resorted to without departing from the spirit of invention or scope of the claims which follow.

What is claimed is:

1. In a hydraulic control system for a vehicle having a transmission and including brake means, comprising first hydraulic passage means connecting a source of pressure fluid to fluid actuated frictional engaging means, said source being provided with pressurizing means for providing pressurized fluid in an amount proportional to the speed of the engine of said vehicle, and a regulating valve disposed in said first hydraulic passage means for selectively manually reducing the hydraulic pressure supplied into said frictional engaging mean in proportion to the degree of actuation of said brake means, said regulating valve comprising:
   a. an elongated valve body forming a first bore therein with a closed end, said body having an inlet port with a first annular groove, first and second outlet ports, an intermediate port and a drain port, with all of said ports communicating with said first bore, said valve body also having a first conduit means, one end of which merges into said first outlet port and the other end of which merges into said intermediate port;
   b. annular spool means forming a second bore therein with a second closed end, said annular spool means being retained within said first bore and having a first annular groove in the outer periphery thereof and a passage connecting said first annular groove and said second bore in an area adjacent said second closed end, said annular spool means being operable to connect, via said first annular groove, said intermediate port with said second outlet port, said spool means having first radial apertures aligned with said inlet port and second radial apertures aligned with said first outlet port, said spool means also having an integral tubular portion of reduced diameter, said reduced diameter portion together with said second bore defining first annular cavity connected on one end with said drain port, with said reduced diameter portion further having third radial apertures for connecting said second bore with said first annular cavity;
   c. regulating spool means actuatable between a first and second position, slidably disposed within said second bore, said regulating spool means having spaced first and second land portions connected by a reduced diameter central portion and defining therewith and said second bore a second annular cavity, said second annular cavity being in constant communication with said first and second outlet ports as well as a chamber defined by said second closed end, said regulating spool means first land portion and said second bore;
   d. first means for biasing said regulating spool means to substantially said first position;
   e. actuating means operatively connected with said brake means for overcoming said first biasing means and permitting said regulating spool means to move to said second position; and
   f. second means for biasing, interposed between an outer end of said regulating spool means second land portion and said actuating means, tending to balance the forces exerted on said regulating spool means by the pressure fluid in said chamber, said actuating means also progressively decreasing the force on said second biasing means as the degree of actuation of said brake means is increased, whereby, when said regulating spool is in said first position, the pressure fluid can freely flow into, through and out of said regulating valve, however in said second position, the fluid flow through said first radial apertures is blocked by said regulating spool means first land portion and thereafter said third radial apertures are progressively opened by said regulating spool means second land portion, thereby regulating the force of the pressure fluid acting on said frictional engaging means.

2. The control system of claim 1 wherein at least one of said first radial apertures is connected to one of said second radial apertures by a longitudinal aperture in said annular spool means, whereby when said regulating spool means is in said first position, the pressure fluid can flow freely into, through and out of said regulating valve so as to effectively bypass said longitudinal aperture.

3. The control system of claim 2 wherein in said second position, when the pressure fluid flow through said first radial apertures is blocked, the pressure fluid can still flow through said longitudinal aperture into said second annular cavity, thereby keeping said frictional engaging means filled with fluid at all times.

4. The control system of claim 2 wherein said longitudinal aperture preferably takes the form of a 0.050 to 0.070 inch diameter orifice.

5. The control system of claim 2 wherein in said second position, once said fuid flow through said first radial apertures is blocked off, an inner end surface of said regulating spool means second land portion progressively opens up said third radial apertures, thereby lowering the pressure of the pressure fluid within said regulating valve until the pressure therein drops to a point wherein the force exerted on said regulating spool means by the pressure fluid within said chamber is in balance with the opposing force exerted by said second biasing means.

6. The control system of claim 5 wherein said regulating valve is a downstream regulator and said inner end surface of said regulating spool means second land portion cooperates with said third radial apertures to regulate the flow of pressure fluid out of said second annular cavity.

7. The control system of claim 2 wherein said frictional engaging means comprises fluid actuated forward and reverse clutch means and said control system further includes a manually operated directional control valve downstream from said regulating valve, said directional control valve being fluidically connected with said regulating valve first and second outlet ports, for controlling the selection of a pair of fluid passages connecting said forward and reverse clutch means with said first hydraulic passage means.

8. The control system of claim 1 wherein said regulating valve is a downstream regulator and an inner end surface of said regulating valve spool means first land portion cooperates with said first radial apertures to regulate the flow of pressure fluid into said second annular cavity.

9. The control system of claim 1 wherein said frictional engaging means comprises fluid actuated forward and reverse clutch means and said control system further includes a manual directional control valve, said directional control valve being connected by a first pair of fluid passages with said regulating valve first and second outlet ports respectively, for controlling the selection of second pair of fluid passages connecting said forward and reverse clutch means with said first hydraulic passage means respectively.

10. The control system of claim 1 wherein said actuating means includes a piston and cylinder actuator means that is fluidically interconnected with a master cylinder of said brake means.

11. The control system of claim 10 wherein a cylinder body portion of said piston and cylinder actuator means directly mechanically abuts an annular end surface of said annular spool means tubular portion and wherein a piston rod portion of said piston and cylinder actuator means directly mechanically abuts an end portion of said regulating spool means between said first and second positions.

12. The control system of claim 10 wherein said brake means includes a brake control valve downstream from said actuator means so as to delay the application of the vehicle brakes until a predetermined degree of actuation of the brake means by the vehicle operator.

* * * * *